US008881128B2

(12) United States Patent　　(10) Patent No.:　　US 8,881,128 B2
Ierullo　　(45) Date of Patent:　　Nov. 4, 2014

(54) METHOD AND SYSTEM FOR ACQUISITION OF AN APPLICATION FOR INSTALLATION AT A COMMUNICATION DEVICE

(75) Inventor: Salvatore Ierullo, Oakville (CA)

(73) Assignee: Blackberry Limited, Waterloo (CA)

( * ) Notice: Subject to any disclaimer, the term of this patent is extended or adjusted under 35 U.S.C. 154(b) by 745 days.

(21) Appl. No.: 12/712,859

(22) Filed: Feb. 25, 2010

(65) Prior Publication Data

US 2011/0209143 A1　　Aug. 25, 2011

(51) Int. Cl.
　　*G06F 9/445*　　(2006.01)
　　*G06Q 10/06*　　(2012.01)
(52) U.S. Cl.
　　CPC . *G06Q 10/06* (2013.01); *G06F 8/61* (2013.01)
　　USPC .......................................... 717/168; 717/178
(58) Field of Classification Search
　　None
　　See application file for complete search history.

(56) References Cited

U.S. PATENT DOCUMENTS

| 6,947,922 | B1 | 9/2005 | Glance |
| 7,409,208 | B1 | 8/2008 | Clare et al. |
| 2003/0192040 | A1 | 10/2003 | Vaughan |
| 2005/0071443 | A1* | 3/2005 | Menon et al. ............... 709/223 |
| 2006/0179432 | A1* | 8/2006 | Walinga et al. ............. 717/171 |
| 2009/0210870 | A1* | 8/2009 | Clark et al. ................. 717/178 |
| 2010/0211458 | A1* | 8/2010 | Ramer et al. ............. 705/14.45 |

FOREIGN PATENT DOCUMENTS

| WO | 2008115764 A | 9/2008 |
| WO | WO 2008/115764 A1 | 9/2008 |

OTHER PUBLICATIONS

Gkekas, Georgios et al. "A Smart Calendar Applications for Mobile Environments", ACM International Conference Proceeding Series; vol. 329, Proceedings of the 3rd international conference on Mobile multimedia communications; Nafpaktos, Greece, Institute for Computer Sciences, Social-Informatics and Telecommunications Engineering; Aug. 27-29, 2007.
Figge, Stefan et al. "3G 'ad' Work—3G's Breakthrough With Mobile Advertising"; Proceedings of the 8th International Workshop on Mobile Multimedia Communications, Munich, Germany, Oct. 5-8.
Extended European Search Report issued by the European Patent Office dated Aug. 9, 2010 for corresponding European Patent Application No. 10154680.2.
European Examination Report issued by the European Patent Office dated Mar. 18, 2011 for corresponding European Patent Application No. 10154680.2.
Canadian Intellectual Property Office, Office Action Mailed Jun. 3, 2013 for Corresponding Canadian Patent Application No. 2,731,759.
European Patent Office, Summons to Attend Oral Proceedings, mailed Jul. 22, 2014, for corresponding European Patent Application No. EP 10154680.2.

* cited by examiner

*Primary Examiner* — Chuck Kendall
(74) *Attorney, Agent, or Firm* — Gowling Lafleur Henderson LLP

(57) ABSTRACT

A method and system for acquisition of an application for installation on a communication device. The method comprises monitoring a frequency of a usage event at the communication device to infer a set of usage characteristics; triggering a search request to a computer server for applications associated with the set of usage characteristics, the triggering of the search request based on a predefined threshold related to the monitored frequency of the usage event; receiving at the communication device a search result compiled at the server computer, the search result including an application for installation thereon; and providing a notification, at a graphical user interface (GUI) of the communication device, of the application for installation thereon.

18 Claims, 4 Drawing Sheets

METHOD AND SYSTEM FOR ACQUISITION OF AN APPLICATION FOR INSTALLATION AT A COMMUNICATION DEVICE

FIELD

The present disclosure relates generally to a system and method for discovery and acquisition of an application for installation at a communication device.

BACKGROUND

With the proliferation of communication devices including handheld computers, applications developed and customized for a myriad of uses have evolved. Especially given the relatively widespread usage of handheld wireless devices, users would be desirous of conveniently discovering and acquiring applications to further enhance the utility of their communication devices in their everyday routines.

BRIEF DESCRIPTION OF THE DRAWINGS

Embodiments are illustrated by way of example only and not limitation, with reference to the following drawings in which like reference numerals indicate corresponding or similar elements, and in which.

DETAILED DESCRIPTION

Figure 1:
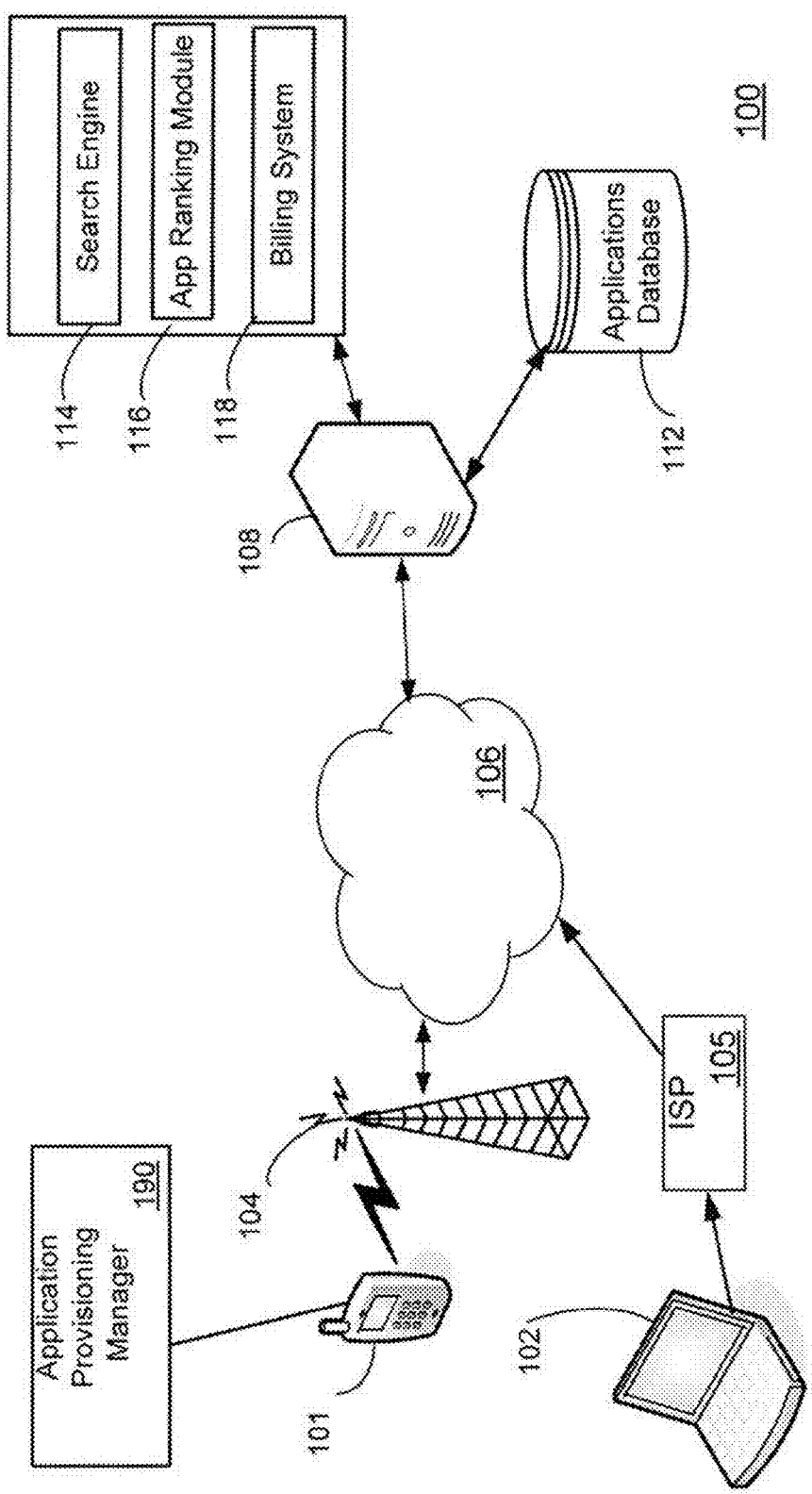
FIG. 1 is a block diagram illustrating a wireless communication system and a communication device which communicates and is capable of discovering and acquiring an application within this system, in accordance with one embodiment.

Accordingly, there is a need for providing convenient ways of discovering and acquiring the most relevant applications for a user of a communication device or handheld computer. To the extent that the process for discovering and acquiring the most relevant or useful applications is performed autonomously and with no conscious user input to initiate or trigger a search request, users will be benefited.

There is provided a method of discovering and acquiring an application for installation on a communication device. The method comprises monitoring a frequency of a usage event at the communication device to infer a set of usage characteristics; triggering a search request to a computer server for applications associated with the set of usage characteristics, the triggering of the search request based on a predefined threshold related to the monitored frequency of the usage event; receiving at the communication device a search result compiled at the server computer, the search result including at least one application for installation thereon; and providing a notification, at a graphical user interface (GUI) of the communication device, of the at least one application for installation thereon.

In an exemplary embodiment, the notification is provided at the GUI upon invocation of an applications-update application for execution at the communication device.

In another exemplary embodiment, the notification provided at the GUI comprises a hypertext link embedded within a message notification.

In another embodiment, the method further comprises selecting, via the hypertext link, the at least one application for uploading; uploading the selected at least one application to the communication device; and installing the at least one application in a memory of the communication device.

In an exemplary variation, the at least one application is uploaded for a limited trial period, subject to full payment being received at the server computer.

In yet another variation, the usage event at the communication device comprises a usage of a pre-existing application installed thereon.

In yet another embodiment, the pre-existing application installed at the communication device comprises a calendar application, and the usage event comprises a scheduled event of the calendar application.

In another exemplary variation, the predefined threshold frequency for triggering the search request comprises a scheduled event having a frequency of at least twice a week within the calendar application.

In another embodiment, the communication device comprises a wireless handheld communication device.

There is further provided a method implemented in a processor of a server computer for discovering an application for installation on a communication, the server computer communicatively coupled to the communication device over a communication network. The method comprises receiving a search request triggered at the communication device for applications associated with an inferred set of usage characteristics, the triggering of the search request based on a predefined threshold related to a monitored frequency of a usage event at the communication device; performing a search for a set of applications associated with the inferred set of usage characteristics; compiling a search result comprising at least one application for installation at the communication device; forwarding a notification to the communication device, the notification for providing at a graphical user interface (GUI) of the communication device the search result including the at least one application for installation thereon.

There is further provided a computer server for discovering an application for installation on a communicatively coupled communication device, the computer server comprises a processor and a memory coupled thereto, the memory storing instructions and data configuring the processor to perform the method according to the above claim.

In an exemplary variation, the search result comprises a plurality of applications.

In yet another exemplary variation, the step of compiling the search result further comprises ranking the plurality of applications.

In a further embodiment, the applications are ranked based on a ranking criterion selected from the group of ranking criteria consisting of: a popularity ranking, a price ranking, and a cumulative total number of downloads ranking.

In yet another embodiment, the notification forwarded to the communication device comprises a message embedding a hypertext link to the at least one application Referring to FIG. 1, a communication system is illustrated generally by numeral 100. The communication system 100 may comprise a plurality of communication devices 101, laptop or desktop computers 102, a base station or antenna 104, a communication network 106, and a carrier system computer server 108 comprising a processor and memory, and having access to message database 112. It will be understood by a person skilled in the art that the communication system 100 of FIG. 1 has been illustrated with a number of pertinent components for exemplary purposes only. Accordingly, a plurality of communication devices 101, base stations 104, communication networks 106, carrier system computer servers 108, and related message databases 112 may be envisaged as needed.

The communication devices 101, 102 are in communication with computer server 108 via the communication network 106, the base station 104, and internet service provider 105. Accordingly, the communication network 106 may include several components such as a wireless network and a relay. The communication network 106 may also be configured to support data and voice communications under the Voice over Internet Protocol (VoIP) scheme.

Communication system 100 is configured to discover and acquire an application for installation at communication device 101. The term application as used herein refers to a software application for execution in a processor of a computer. Optionally, the communication system 100 may be configured to track usage of the applications discovery and acquisition service and to provide financial compensation for applications bought by a user of the communication devices 101 via the billing system 118 of server computer 108. The applications may be delivered or forwarded indirectly via the carrier system server computer 108 to the communication devices 101, 102.

Wireless communication services are typically provided on a service contract basis where the communication device user enters a service contract with a wireless carrier to have wireless service provided to the communication device 101. Accordingly, the carrier system 108 may be configured to store information in memory such as the communication device 101 user(s) name and billing information, wireless service plan, equipment type, and any other pertinent information to facilitate wireless communication for the communication device 101. The carrier system 108 is a further coupled for communication with carrier infrastructure including a billing system 118. Billing system 118 may be configured to track and store billing information for the communication device 101 based on the services plan and usage of applications as purchased by communication device 101.

Referring again to FIG. 1, the carrier system server computer 108 is coupled to a source of applications for downloading and purchasing, such as database 112. Carrier system server computer 108 may comprise, in addition to billing system 118, an applications search engine 114 and an applications ranking module 116.

Applications search engine 114 of server computer 108 may comprise any combination of software, firmware and hardware to search applications by comparing the content of the applications with a set of usage characteristics captured at communication device 101 and provided to applications search engine 114. In this manner, the usage characteristics inferred at communication device 101, and described in more detail below, function in lieu of a text-based search string that traditionally is input by a user to provide search parameters. By searching for applications likely associated with the set of usage characteristics provided by communication device 101, a search result comprising a list of applications may be returned.

Applications ranking module 116 of server computer 108 may comprise any combination of software, firmware and hardware to optionally rank the returned search results from search engine 114 before forwarding to communication device 101. For instance, any applications returned from the search may be ranked or scored based one or more criteria. Exemplary ranking criteria may be based on one or any combination of a popularity ranking (such as "two thumbs up" or "4 stars out of 5"), a price ranking (lower prices ranked higher than higher prices, for example), and also the cumulative total number of downloads by users of the given application.

It will be appreciated by a person of ordinary skill in the art that the communication system 100 described herein is exemplary and that changes may be made to one or more components to accommodate different network configurations without affecting the scope of the disclosure herein. Further, although the present description may specifically recite a communication device 101, it will be appreciated that other types of devices, including both wired and wireless devices, may be employed.

Figure 2:
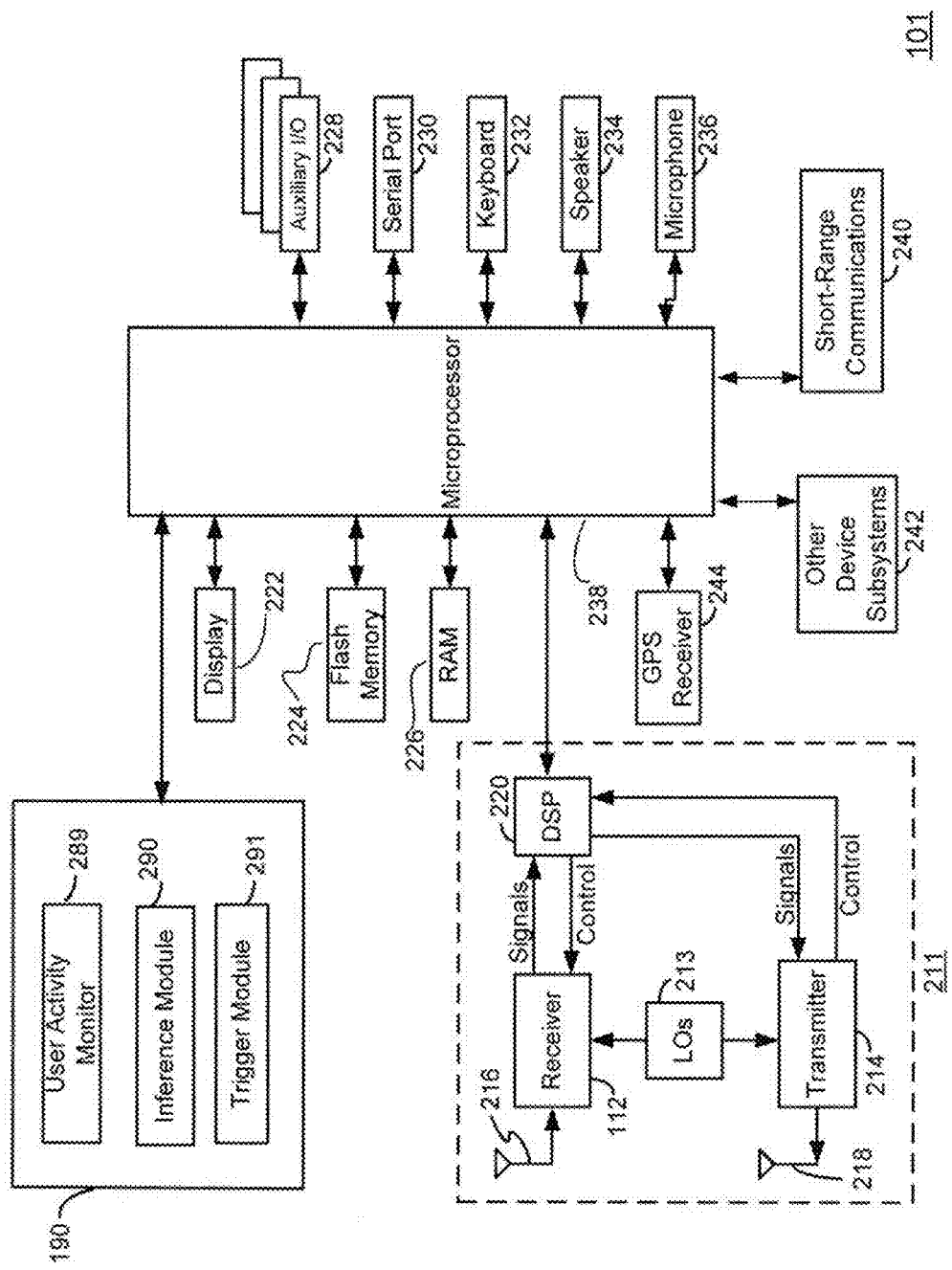
FIG. 2 is a block diagram illustrating an exemplary electronic architecture of the communication device of FIG. 1.

Referring to FIG. 2, components of the communication device 101 are illustrated in greater detail. The communication device 101 may be a two-way communication device having both voice and data communication capabilities, including the capability to communicate with other computer systems. Depending on the functionality provided by the communication device 101, it may be referred to as a data messaging device, a two-way pager, a cellular telephone with data messaging capabilities, a wireless Internet appliance, or a data communication device.

The communication device 101 includes a wireless communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network, for example a Wireless Fidelity ("Wi-Fi") network based on the IEEE 802.x protocol, in which communication device 101 is intended to operate.

The communication device 101 includes a microprocessor 238 which controls general operation of the communication device 101. The microprocessor 238 also interacts with additional device subsystems such as a display screen 222, a flash memory 224, a random access memory (RAM) 226, auxiliary input/output (I/O) subsystems 228, a serial port 230, a keyboard 232, a speaker 234 for presentation of audible output, a microphone 236, a short-range communications subsystem 240 such as Bluetooth™ for example, and any other device subsystems or peripheral devices generally designated at 242. The communication device 101 may also include a positioning device 244, such as a GPS receiver for example, for receiving positioning information Operating system software used by the microprocessor 238 may be stored in a persistent store of memory such as the flash memory 224, which may alternatively be a read-only memory (ROM) or similar storage element (not shown). Those skilled in the art will appreciate that the operating system, specific device applications, or parts thereof, may be temporarily loaded into a volatile store of memory such as RAM 226.

The microprocessor 238, in addition to its operating system functions, typically enables execution of software applications on the communication device 101. A pre-existing set of applications, which control fundamental device operations, may be installed on the communication device 101 during its manufacture. The basic applications typically include data and voice communication applications, such as calendar and address book applications, for example. Additionally, applications may also be loaded onto the communication device 101 through the network 106, an auxiliary I/O subsystem 228, serial port 230, short-range communications subsystem 240, or any other suitable subsystem 242, and installed by a user in RAM 226, or the persistent store 224, for execution by the microprocessor 238. Such flexibility in application installation increases the functionality of the communication device 101 and may provide enhanced on-device features, communication-related features, or both.

The display screen 222 may be used to visually present an application's graphical user interface (GUI) to the user. The user can manipulate application data by modifying information on the GUI using an input device such as the keyboard 232 for example. Depending on the type of communication device 101, the user may be provided with other types of input devices, such as, for example, a scroll wheel, trackball, light pen or a touch sensitive display screen as user interface.

Referring again to FIG. 2, the communication device 101 further includes application provisioning manager 190. The application provisioning manager 190 may be configured to trigger discovery and acquisition of applications for downloading in memory 224, 226 of communication device 101. The application provisioning manager 190 may comprise user activity monitor 289, inference module 290, and trigger module 291.

User activity monitor 289 may comprise any combination of software, firmware and hardware to monitor user activity at the various applications of communication device 101, for example usage activity at a calendar application, an address book application, or an email application or other messaging application, including a Simple Messaging Service (SMS) application. User activity within a calendar application, for instance, may include scheduling particular events such as "lunch", "dinner", "exercise at gym", for instance. Some events may repeat with multiple frequency of occurrences based on the user's daily or weekly routine, while others will be one of a kind calendar entries corresponding to like events.

In one exemplary implementation, it is contemplated that the scheduled calendar event causes the activity monitor 289 to monitor device usage activity during the duration of that calendared event (e.g., which applications are run, searches performed by the user, phone calls made, location, and event descriptors. For example, if a one hour calendar event is scheduled at 12:00 pm on a given day, the activity monitor 289 monitors the device usage activity from 12:00 to 1:00.

Inference module 290 may comprise any combination of software, firmware and hardware to autonomously infer a set of usage characteristics, without any input from the user, which may function as search parameters to result in discovery of an application likely to be of interest to a user. For instance, and for illustrative purposes, while a user is in a restaurant having dinner or lunch, as inferred from a current calendar entry of "lunch" or "dinner", and furthermore invoking a full calculator application, it may be inferred that a simplified tip calculator application might be of interest to the user. So in this illustrative case, a set of usage characteristics supplied by inference module 290 may be inferred from contextual information combined with calendar application information, to result in a set of usage characteristics such as "dinner; restaurant; calculator".

Trigger module 291 may comprise any combination of software, firmware and hardware to generate a search request for an application likely to be of interest to a user of communication device 101. Applications likely to be of interest to a user may reasonably related also to the frequency with which a user is likely to use or invoke the given application. As such, while inference module 290 supplies the "search-text string"-equivalent, one criteria used for triggering an actual search request may be a frequency with which the "search-text string"-equivalent is inferred by the user. Thus for example, the search resulting in the tip calculator of the above example may not actually be triggered, or generated, until the inference "dinner; restaurant; calculator" is experienced more than twice per week, for example. It is contemplated that the user of communication device 101 may be able to predefine and set a threshold for the frequency of such a usage event.

It is contemplated that a calendar application and address book application of communication device 100 would be data-accessible to user activity monitor 289, inference module 290, and trigger module 291 via memory 224, 226 and processor 238.

Figure 3:
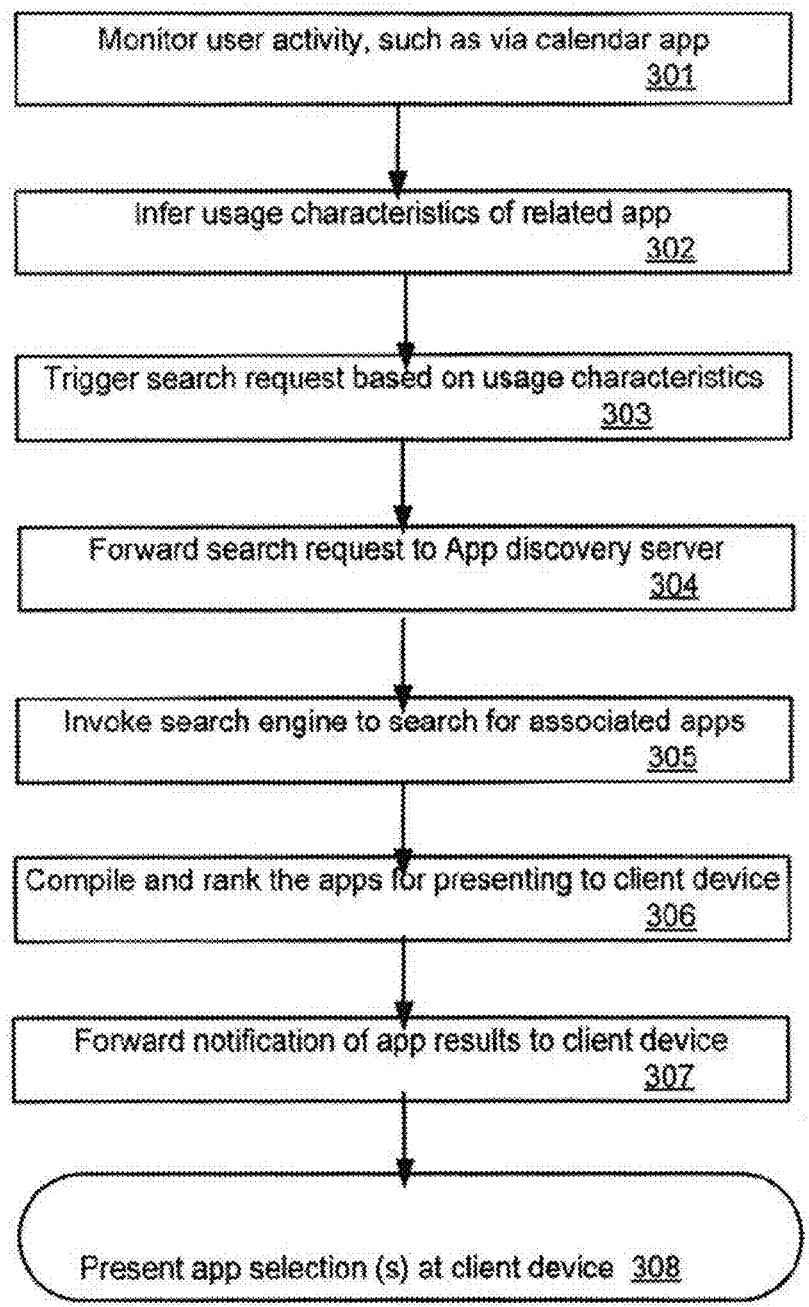
FIG. 3 is an exemplary process flow of interactions within the system depicted in FIG. 1.

FIG. 3 is an exemplary process flow of interactions within the system depicted in FIG. 1. At step 301, usage activity is monitored, such as within a pre-existing calendar application at the communication device 101. At step 302, inference module 290 infers a set of usage characteristics likely to be associated with an application of interest to the user. At step 304, when the frequency of the usage event exceeds a threshold frequency predefined by the user, trigger module 291 generates a search request based on the set of usage characteristics. At step 304, the search request is forwarded or directed to search engine 114 of server computer 108. At step 305, search engine 114 searches for applications likely to be interest to the user. At step 306, search engine 114 compiles the search results comprising a list of applications, and optionally application ranking module 116 may be invoked to appropriately rank the list of applications before forwarding the search results for presentation at communication device 101. At step 307, notification of the applications from the search result, optionally as ranked, may be sent to a GUI display screen 222 of communication device 101.

In one embodiment, the notification is in the form of a message, such as an email or SMS message, listing the applications along with a hypertext link for convenient selection of an application for download. The user may simply click the hypertext link to download the selected application for installation thereof in the memory of communication device 101.

It is also contemplated that other forms or variations of notification may be applied. For example, notification of the applications from the search may be delayed until a specific applications-update application is actually invoked for execution at the communication device. In such case, the home screen for the applications update application may include recommendations determined by the application provisioning manager 190. In this case, the recommendations may be communicated to an applications-update application, and the recommendations may become associated with the user's account profile. In another exemplary embodiment, the recommendation may be provided to (or made available from) the calendar application so that when the user accesses the calendar application, the recommendations are presented as part of the calendar entry. This may be particularly useful for recurring calendar events, as the user may then be less likely to skip the application advertisement or offer presented. The notification may additionally take the form of a short cut to the applications-update application, and may also take advantage of any on-device (or device accessible) payments systems to effect purchase and payment of the recommended application.

It is also contemplated that any one or several of the steps depicted in FIG. 3 as being performed at the communication device 101 may be alternately implemented via a server computer, such as carrier systems server computer 108, communicatively coupled to communication device 101. For instance, server computer 106 may be tasked with the steps of monitoring the frequency of the usage event at the communication device to infer the set of usage characteristics, and then also triggering the search request for applications associated with the set of usage characteristics, the triggering of the search request based on a predefined threshold related to the monitored frequency of the usage event.

Figure 4:
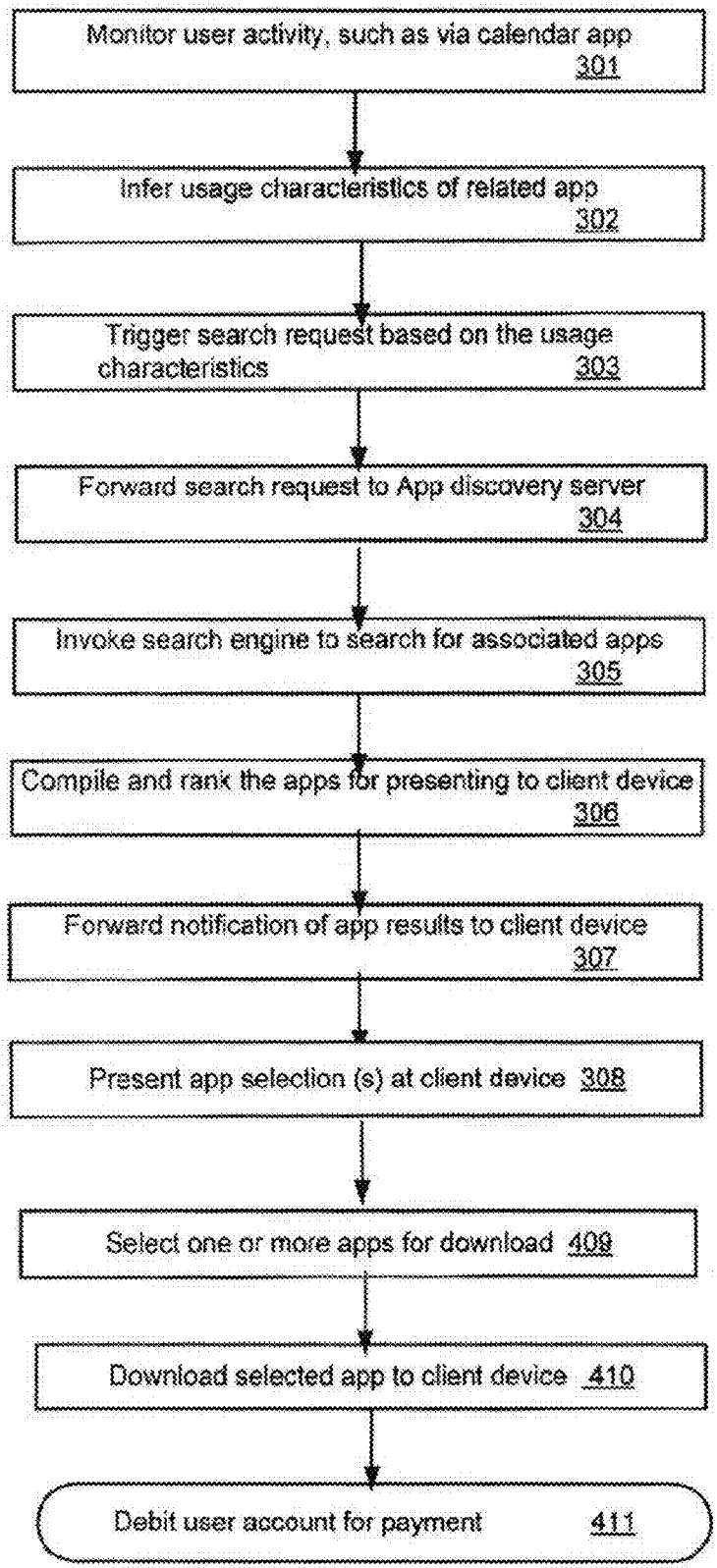
FIG. 4 illustrates an exemplary variation of the interactions within the process flow depicted in FIG. 3.

FIG. 4 depicts another variation of the process flow among components of the system of FIG. 1 for discovering and acquiring an application for installation at the communication device 101. Subsequent to step 308 discussed above for FIG. 3, at step 409, the user may be able to select one or more applications presented at the GUI, for download at communication device 101. At step 410, the selected application, or applications are downloaded and installed in the memory 224, 226 of communication device 101. In another exemplary variation, it is contemplated that the user may be given only a limited period for use of the application on a trial basis, subject to payment of the full price of the application being made at billing system 118 of server computer 118.

Although various embodiments have been described in the disclosure herein, it will be understood by those skilled in the art that further variations may be made without departing from the scope of the appended claims.

What is claimed is:

1. A method of discovering and acquiring an application for installation on a mobile communication device, the method comprising:
at the mobile communication device, monitoring a frequency of a usage activity of a pre-existing application program already installed on and executed at the mobile communication device to autonomously infer a set of usage characteristics from the frequency of the usage activity and contextual information, the contextual information including a location of the mobile communication device and an initiation of a second application program at the mobile communication device;
triggering a search request to a server computer for applications associated with the set of usage characteristics, the triggering of the search request based on a predefined threshold related to the monitored frequency;
receiving at the mobile communication device a search result compiled at the server computer, the search result including at least one application for installation thereon; and
providing a notification, at a graphical user interface (GUI) of the mobile communication device, of the at least one application for installation thereon.

2. The method of claim 1 wherein the notification is provided at the GUI upon invocation of an applications-update application for execution at the communication device.

3. The method of claim 1 wherein the notification provided at the GUI comprises a hypertext link embedded within a message notification.

4. The method of claim 3 further comprising:
selecting, via the hypertext link, the at least one application for uploading;
uploading the selected at least one application to the communication device; and
installing the at least one application in a memory of the communication device.

5. The method of claim 4 wherein the at least one application is uploaded for a limited trial period, subject to full payment being received at the server computer.

6. The method of claim 1 wherein the usage activity at the communication device comprises a usage of the pre-existing application program installed thereon.

7. The method of claim 6 wherein the pre-existing application program installed at the communication device comprises a calendar application, and the usage activity comprises a scheduled event of the calendar application.

8. The method of claim 7 wherein the predefined threshold for triggering the search request comprises a scheduled event having a frequency of at least twice a week within the calendar application.

9. A computer program product storing instructions and data to configure a processor to perform the method of claim 1.

10. A mobile communication device for discovering and acquiring an application for installation thereon, the mobile communication device comprising:
a processor and a memory coupled thereto, the memory storing instructions and data configuring the processor to perform the method according to claim 1.

11. The mobile communication device of claim 10 comprising a wireless handheld communication device.

12. A method implemented in a processor of a server computer for discovering an application for installation on a mobile communication device, the server computer communicatively coupled to the mobile communication device over a communication network, the method comprising:
receiving a search request triggered at the mobile communication device for applications associated with an autonomously inferred set of usage characteristics, the triggering of the search request based on a predefined threshold related to, at the mobile communication device, a monitored frequency of a usage activity of a pre-existing application program already installed on and executed at the mobile communication device and contextual information, the contextual information including a location of the mobile communication device and an initiation of a second application program at the mobile communication device;
performing a search for a set of applications associated with the inferred set of usage characteristics;
compiling a search result comprising at least one application for installation at the mobile communication device;
forwarding a notification to the communication device, the notification for providing at a graphical user interface (GUI) of the mobile communication device the search result including the at least one application for installation thereon.

13. The method of claim 12 wherein the search result comprises a plurality of applications.

14. The method of claim 13 wherein the step of compiling the search result further comprises ranking the plurality of applications.

15. The method of claim 13 further comprising ranking the plurality of applications based on a ranking criterion selected from the group of ranking criteria consisting of: a popularity ranking, a price ranking, and a cumulative total number of downloads ranking.

16. The method of claim 13 wherein the notification forwarded to the communication device comprises a message embedding a hypertext link to the at least one application.

17. A computer program product storing instructions and data to configure a processor to perform the method of claim 12.

18. A server computer for discovering an application for installation on a communicatively coupled mobile communication device, the server computer comprising:
a processor and a memory coupled thereto, the memory storing instructions and data configuring the processor to perform the method according to claim 12.

* * * * *